N. P. PICHULA.
MACHINE FOR SEPARATING WEED SEEDS FROM CORN WASTE.
APPLICATION FILED SEPT. 12, 1910.
1,027,274.
Patented May 21, 1912.
2 SHEETS—SHEET 1.
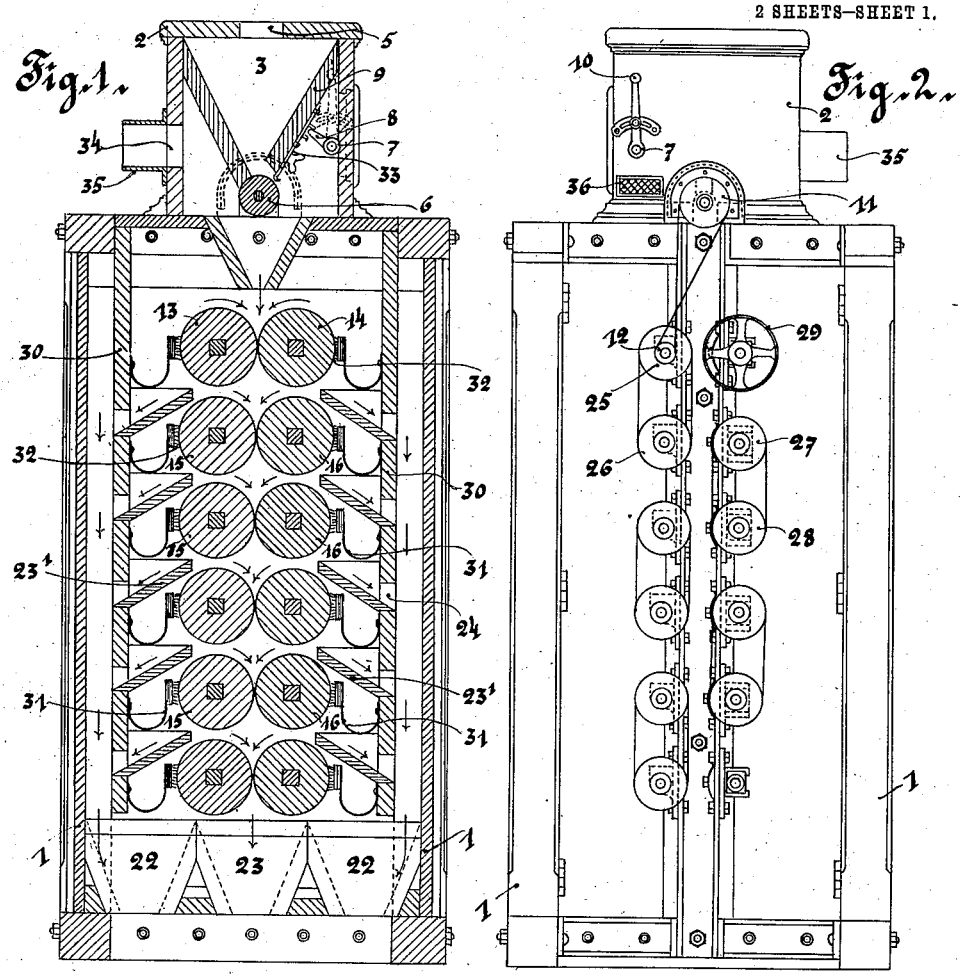
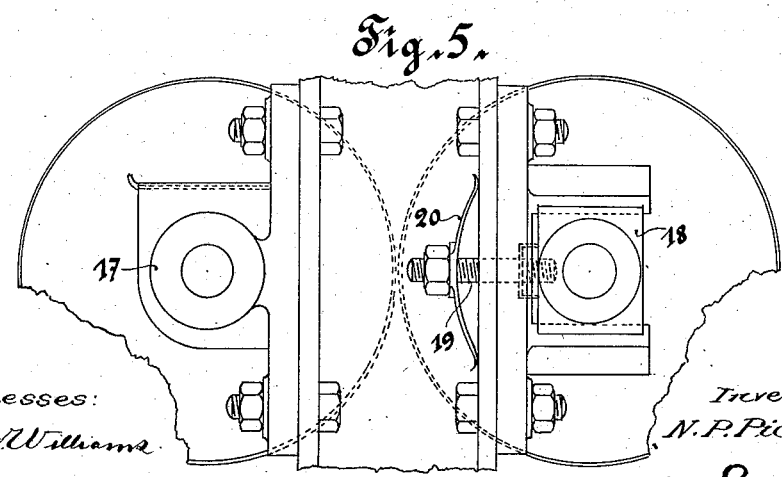

N. P. PICHULA.
MACHINE FOR SEPARATING WEED SEEDS FROM CORN WASTE.
APPLICATION FILED SEPT. 12, 1910.
1,027,274.
Patented May 21, 1912.
2 SHEETS—SHEET 2.
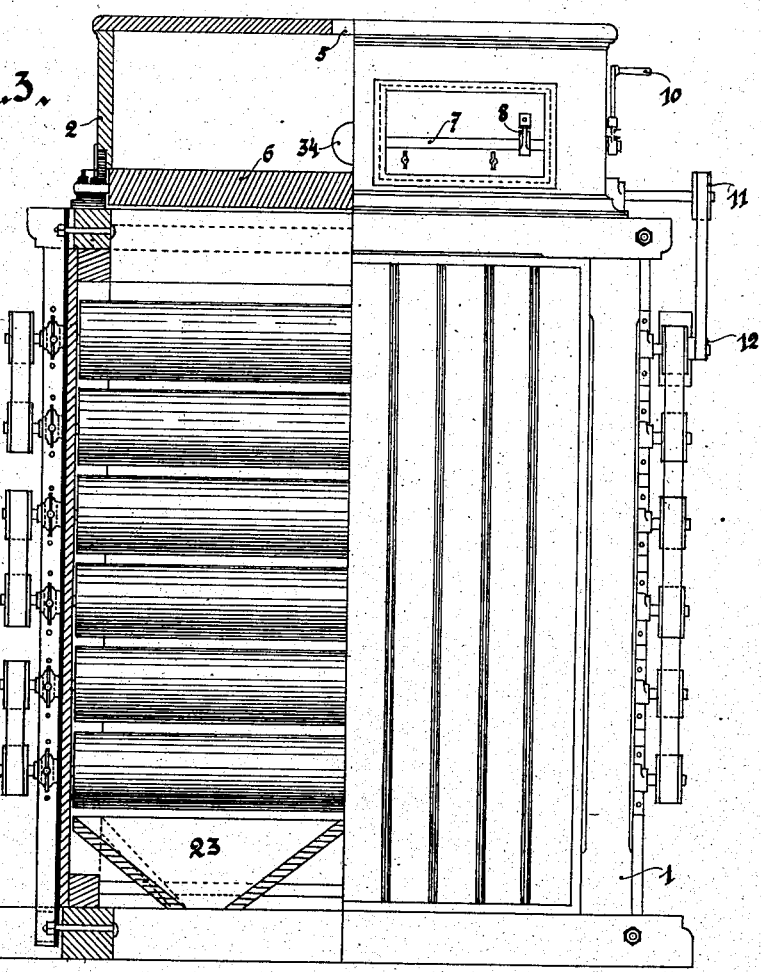
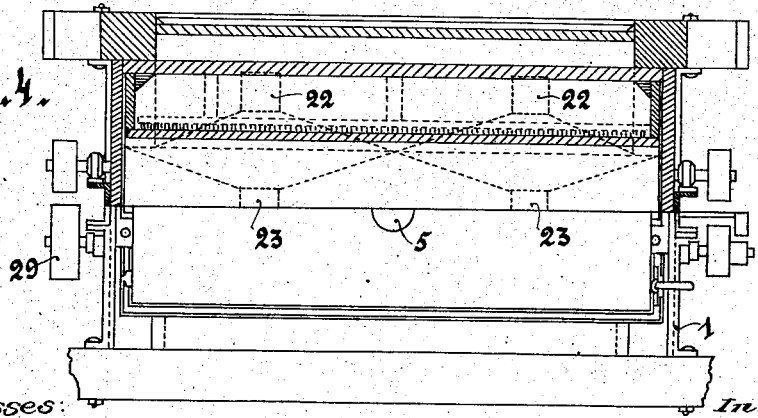

UNITED STATES PATENT OFFICE.

NIKOLAI PAWLOWITSCH PICHULA, OF ROSTOF-ON-THE-DON, RUSSIA.

MACHINE FOR SEPARATING WEED-SEEDS FROM CORN-WASTE.

1,027,274.  Specification of Letters Patent.  Patented May 21, 1912.

Application filed September 12, 1910. Serial No. 581,580.

*To all whom it may concern:*

Be it known that I, NIKOLAI PAWLOWITSCH PICHULA, subject of the Czar of Russia, residing at No. 1/3 Smyrnowsky Spoosk, Rostof-on-the-Don, Russia, have invented new and useful Improvements in Machines for Separating Weed - Seeds from Corn-Waste, of which the following is a specification.

Existing machines for separating weed seeds from corn have the disadvantage that the "waste" discharge of such machines contains large quantities of broken grain, more particularly in the case of wheat, in addition to the weed seeds separated from the whole grain, whereby a considerable percentage of grain is lost.

Now the present invention has for its object to provide an improved machine for separating the weed seeds from such "waste."

The construction and operation of the improved machine are substantially as follows:—

The "waste" is passed in a stream between two series of oppositely rotating working rollers arranged in contacting pairs in a vertical plane. These rollers are provided with a rough covering so that the grains of wheat which have a comparatively smooth surface will not adhere to the covered rollers but will slip down freely between the contacting rollers and thus pass down between the lower pairs of rollers into receptacles whence they can be removed for filling into sacks. Meanwhile the weed seeds which have rougher surfaces will adhere to the rough surfaces of the rotating rollers and get caught therein, to be subsequently removed therefrom by spring-operated brushes extending along the sides of the rollers. By this means the weed seeds are directed on to inclined planes whence they fall through passages in the sides of the machine into discharging funnels.

One construction of the improved machine is illustrated by way of example in the accompanying drawings, in which:—

Figure 1 is a central vertical cross section; Fig. 2 an end elevation; Fig. 3 a side elevation partly in longitudinal vertical section, and, Fig. 4 a plan partly in cross section of the machine. Fig. 5 is an end elevation on an enlarged scale of a pair of working rollers with their bearings.

As shown, the machine framing consists of a rectangular box 1 provided with an upper chamber 2 containing an upper charging hopper 3. A slide 33 mounted on the side 9 of this hopper, is capable of being slid up and down by means of the finger 8 and lever 10 so as to regulate the size of the discharge opening of the hopper.

A small fluted roller 6 is arranged underneath along the entire length of the hopper 3; its axle is fitted externally with a pulley driven by belting or other means from the pulley keyed on the axle 12 of the roller 13.

A funnel 4 is arranged underneath the roller 6 along the entire length of the hopper 3, with its lower opening in the same vertical plane as the lines of contact of the two rows of working rollers.

Each pair of working rollers 13, 14, and 15, 16, is situated in a horizontal plane, and each pair is arranged a determined distance from the other pair. The upper rollers 13, 14 are covered tightly with rough cloth, leather, or other soft hairy material. The lower rollers are preferably covered with well worked Russia leather having the hairy side turned outward.

The rollers are preferably made of wood turned accurately to size. All the rollers of one series rotate in fixed bearings 17, and all the rollers of the other series rotate in movable bearings 18 in which the degree of contact between the rollers of each pair can be adjusted by means of a nut on the screw 19 and of a spring 20.

Brushes 32 extend the whole length of the rollers and are pressed against the rollers by springs 31. The brushes remove from the surfaces of the rollers, the weed seeds that have been caught in said surfaces. These weed seeds then pass along inclined planes 23 whence they fall into the passage 21 and thence into the discharging funnels 22.

On the outer portion of the axle of the roller 14 there is keyed a pulley 29 that is driven by a motor, a steam engine or a hand crank. A similar pulley keyed on the outer portion of the axle of the roller 13, is driven by means independent of the roller 14. In this manner each series of rollers is driven independently of the other series of rollers. This arrangement is designed to dispense with driving and driven rollers, in order to prevent the weed seeds that adhere to one roller from being removed by the other roller. The respective rotations of the rollers 13 and 14 are transmitted by means of a belt drive arranged in alternating steps or in any other suitable manner to the lower rollers.

The operation of the machine is as follows:—A quantity of "waste" is charged through the opening 5 into the hopper 3. Then by operating the lever 10 a slit-like aperture is opened to the desired extent between the side 9 and the fluted roller 6. By the action of the roller 6 which is rotated by the roller 13 by means of the driving pulleys 12 and 11, the "waste" is carried into the funnel 4 from which it falls in a uniform stream between the first pair of rollers 13 and 14. Here the broken grains of wheat having a comparatively smooth surface pass down freely between the rollers and thence between the next lower pairs of rollers, and finally into the grain receptacle. Meanwhile the weed seeds which have a rougher surface, get caught in the covering of the first pair of rollers from which they are swept off by the brushes 32 and are conveyed along the inclined planes to the discharging funnels. Any weed seeds that may happen to slip with the grains of wheat through the first pair of rollers, pass into the next pair of rollers, where the weed seeds gradually become caught in the coverings of the rollers from which they are removed by brushes so that finally only completely clean wheat passes through the lowest pair of rollers.

The first and topmost pair of rollers are covered with a rougher material with the objects, (1) of allowing the stream of "waste" which is at first more copious, to become embedded more deeply into the surfaces of the rollers; (2) of insuring that the weed seeds shall become embedded in the surfaces of the rollers to a large extent at the beginning, and (3) of preventing the grains of wheat from being further broken, more especially as the first stream of "waste" which passes between those rollers, is rather dense.

The improved machine may be provided with a dust-exhausting device if desired. For this purpose an opening 34 may be formed in one side of the charging hopper 2, and connected by means of a pipe 35 with the main exhauster of the mill.

36 is an aperture for the entry of the outside air; it is preferably copered with a straining material. The outside air entering through the aperture 36, passes through the stream of "waste" falling from the hopper 3 into the funnel 4 and thus removes the dust; it then passes through the opening 34 to the dust-exhauster and the main dust chamber.

Having thus particularly described my invention, what I claim, and desire to secure by Letters Patent of the United States, is—

1. A machine of the class described, comprising a housing, a hopper mounted on the housing, two vertical series of horizontal rolls mounted in the housing below the hopper, the rolls of each series being adjacent to and coöperating with the other series of rolls, the upper roll of each series having a covering of rough coarse hairy material and the surfaces of the remaining rolls having a covering of well worked hairy material, the hair on the latter material being finer than the hair on the top rolls of the two series.

2. A machine of the class described, comprising a housing, a hopper mounted on the housing, two vertical series of horizontal rolls mounted in the housing below the hopper, the rolls of each series being adjacent to and coöperating with the other series of rolls, the upper roll of each series having a covering of rough, coarse hairy material, the surfaces of the remaining rolls having a covering of well worked hairy material, the hair on the latter material being finer than the hair on the top rolls of the two series and means for driving each series of rolls independently of the other.

In testimony whereof I have signed my name to this specification in the presence of two subscribing witnesses.

NIKOLAI PAWLOWITSCH PICHULA.

Witnesses:
  D. PAPADACHI,
  R. MÜLLER.

---

Copies of this patent may be obtained for five cents each, by addressing the "Commissioner of Patents, Washington, D. C."